United States Patent Office 3,236,347
Patented Feb. 22, 1966

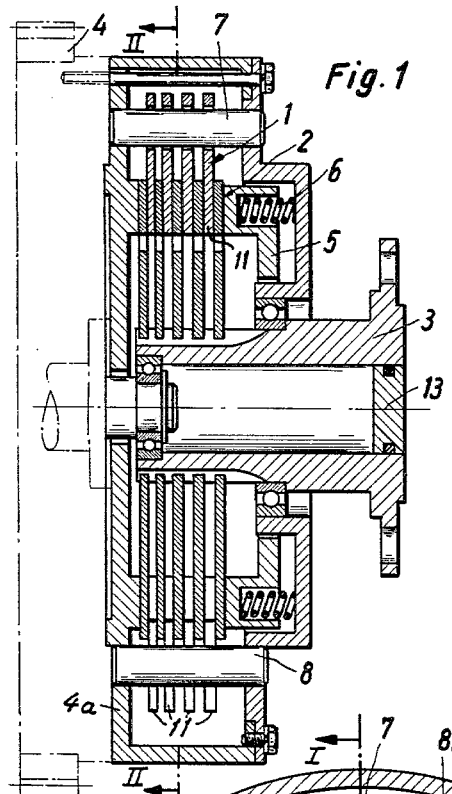
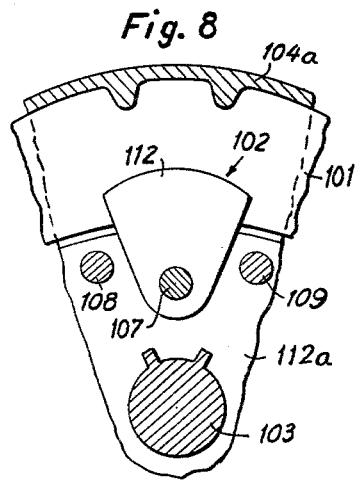
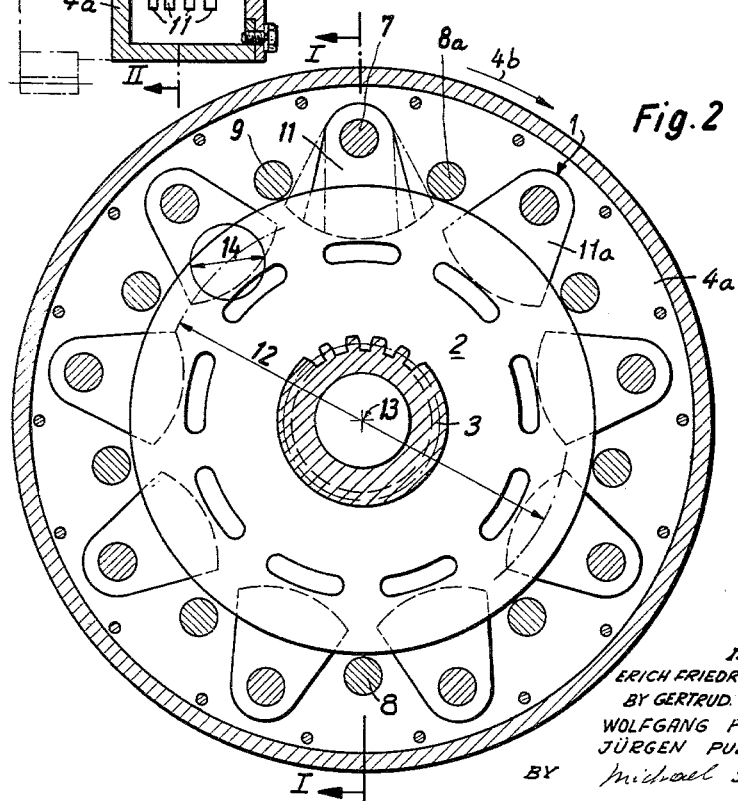
Fig. 1
Fig. 8
Fig. 2
INVENTORS:
ERICH FRIEDRICH PULS, DECEASED
BY GERTRUD PULS, EXECUTRIX
WOLFGANG PULS
JÜRGEN PULS
BY Michael S. Striker
their ATTORNEY.

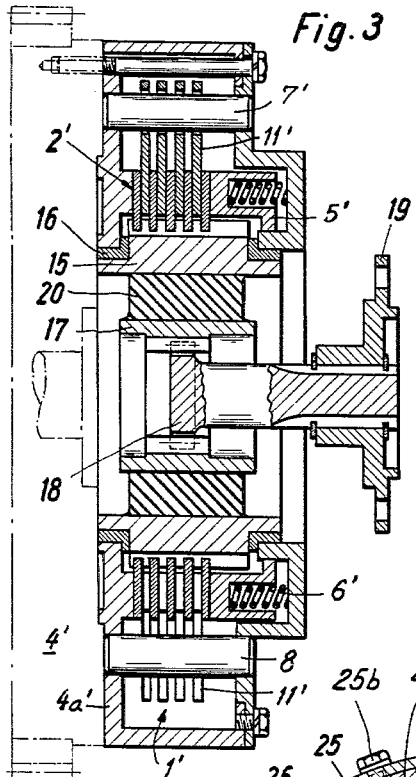
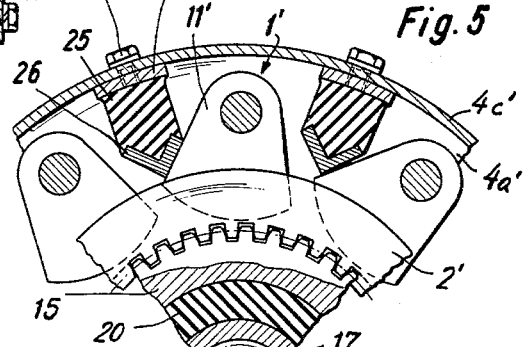
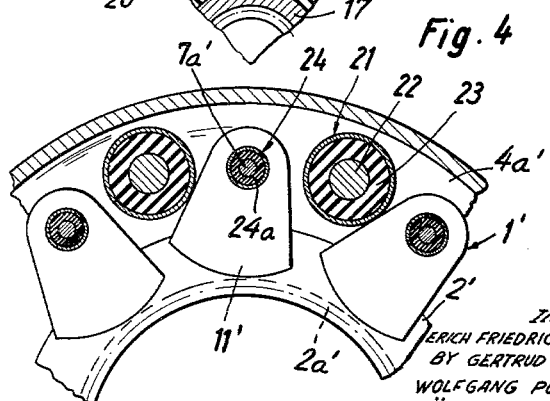

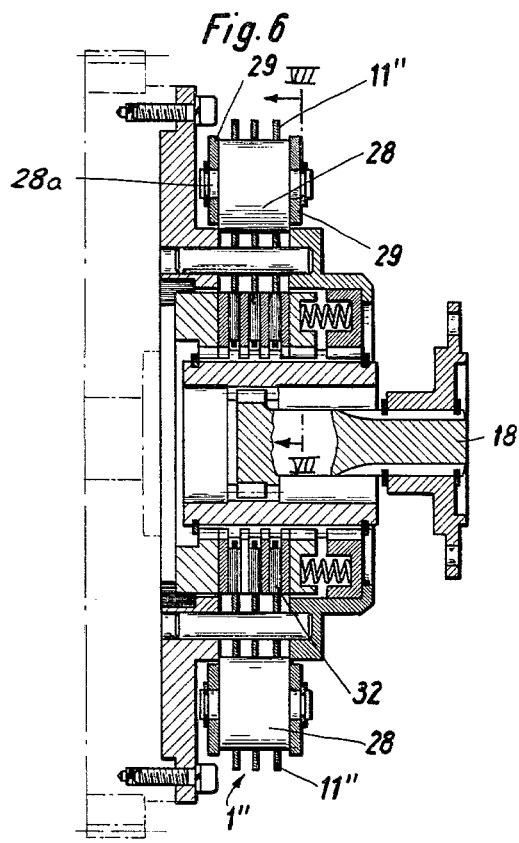
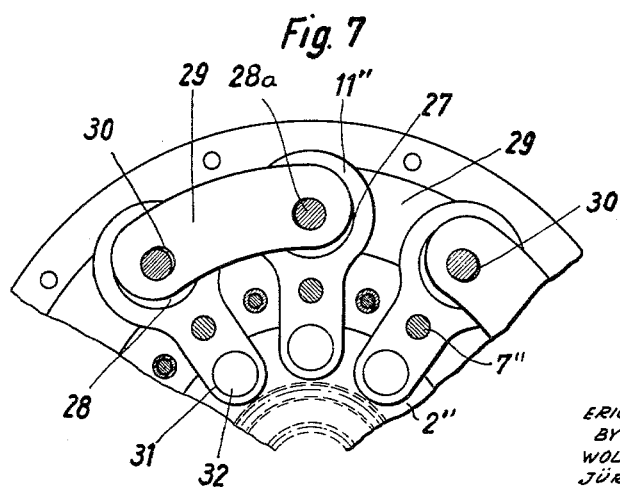

3,236,347
FRICTION CLUTCH
Erich Friedrich Puls, deceased, late of Karlsruhe, Germany, by Gertrud Puls, executrix, Wiesbadenerstrasse 1a, Karlsruhe, Germany, and Wolfgang Puls, Durkheimerstr. 6, and Jurgen Puls, Wiesbadenerstr. 1a, both of Karlsruhe, Germany
Filed Aug. 22, 1963, Ser. No. 304,303
Claims priority, application Germany, Aug. 22, 1962, P 30,067
20 Claims. (Cl. 192—69)

The present invention relates to friction clutches in general, and more particularly to improvements in a clutch of the type generally known as single-plate or multiple-disk clutch.

It is an important object of our invention to provide a friction clutch which absorbs at least some fluctuations in driving torque so that such fluctuations cannot be transmitted to the driven members of the assembly in which the clutch is being put to use.

Another object of the invention is to provide a novel driving or driven disk which may be used in a friction clutch of the above outlined characteristics.

A further object of our invention is to provide a clutch wherein the friction between the driving and driven disks decreases automatically in response to undesirable fluctuations in driving torque and wherein the extent to which the friction decreases may be regulated with utmost precision.

An additional object of the invention is to provide a friction clutch which is especially suited to transmit driving torque from the output shaft of a diesel engine and which may be utilized as a safety clutch wherein the driving disks are in permanent frictional engagement with the driven disks or as an adjustable clutch wherein the pressure plate may be moved to control friction between the driving and driven disks at the will of the operator.

With the above objects in view, one feature of our invention resides in the provision of a friction clutch which may assume the form of a single-plate clutch or a multiple-disk clutch and which comprises a driving disk, a rotary driving member coaxial with and arranged to rotate the driving disk, a rotary driven member coaxial with the driving member, and a driven disk which is concentric with the driving disk and which is arranged to rotate the driven member in response to frictional engagement with the driving disk. In accordance with our invention, at least one of these disks comprises a plurality of adjacent sections which are independent of each other and which rotate about the axes of rigid or resiliently yieldable pivots which are mounted on that member which cooperates with the multi-section disk. The axes of the pivots are parallel with the common axis of the driving and driven members and these pivots are mounted in radially spaced relation with reference to the other disk, i.e., the other disk does not overlap the pivots of the rotatable sections. The clutch further comprises rigid or resiliently yieldable stop means provided on that member which cooperates with the multi-section disk and arranged to limit rotation of the sections about their respective pivots so that the clutch may transmit full driving torque in a clockwise or anticlockwise direction but that the frictional engagement between the multi-section disk and the other disk will be less when the sections actually rotate about their pivots.

The novel features which are considered as characteristic of the invention are set forth in particular in the appended claims. The improved clutch itself, however, both as to its construction and its method of operation, together with additional features and advantages thereof, will be best understood from the following detailed description of certain specific embodiments with reference to the accompanying drawings, in which:

FIG. 1 is an axial section through a multiple-disk clutch wherein each driving disk comprises a plurality of rotary sections, the view of FIG. 1 being taken in the direction of arrows as seen from the line I—I of FIG. 2;

FIG. 2 is a transverse section as seen in the direction of arrows from the line II—II of FIG. 1;

FIG. 3 is an axial section through a modified multiple-disk clutch wherein the connection between the driven disks and the clutch shaft comprises an elastic coupling;

FIG. 4 is a fragmentary transverse section through a third clutch wherein the pivots and stops for the sections of a single driving disk comprise portions of resiliently yieldable material;

FIG. 5 is a fragmentary transverse section through a fourth clutch wherein the stops for the sections of the driving disks are subjected to bending stresses when the clutch is in actual use;

FIG. 6 is an axial section through a multiple-disk clutch wherein the sections of driving disks are combined with specially mounted weights which control the rotation of such sections about the respective pivots;

FIG. 7 is a fragmentary transverse section as seen in the direction of arrows from the line VII—VII of FIG. 6; and FIG. 8 is a fragmentary transverse section through a clutch wherein each driven disk comprises two or more rotatable sections.

Referring to FIGS. 1 and 2, there is shown a multiple-disk clutch which comprises a first package consisting of several outer disks 1 arranged to drive a second package consisting of a series of overlapping inner disks 2. The outer disks are the driving disks of the clutch and are indirectly secured to a driving member here shown as the flywheel 4 (indicated by phantom lines) of a diesel engine. The inner disks 2 which are the driven disks of the clutch are provided with teeth engaging with the splines of a rotary driven member in the form of a clutch shaft 3, the latter serving to drive a transmission of another driven assembly of the machine in which the clutch is put to use.

The packages of driving and driven disks 1, 2 are accommodated in a clutch housing or rotor 4a which is bolted to and which rotates with the flywheel 4. This rotor 4a accommodates a pressure plate 5 which is biased by clutch springs 6 in order to maintain the disks 1 in frictional engagement with the disks 2. Each of the disks 1, 2 is movable in the direction of the clutch axis 13. The bias of the springs 6 determines the maximum torque which may be transmitted to the shaft 3.

In accordance with the present invention, the disks 1 and/or 2 consist of several sections each arranged to rotate about an axis which is parallel with the clutch axis 13. In the embodiment of FIGS. 1 and 2, each outer disk 1 comprises two or more (e.g., nine) sections or segments 11 which are rotatable with respect to and which are movable in the axial direction of rigid cylindrical pivots 7 secured to the rotor 4a. The axes of the pivots 7 are disposed on the periphery of a circle whose center is located in the clutch axis 13 and which surrounds the driven disks 2, i.e., which is spaced radially from the driven disks. The extent to which the disk sections 11 may rotate about the respective pivots 7 is determined by rigid stops in the form of cylindrical pins 8, 9 which are fixed to the rotor 4a and which are adjacent to the peripheries of the disks 2. It will be noted that each of these stops 8, 9 may limit rotation of a first section 11 in a clockwise direction and that the same stop may limit rotation of a second section 11 in a counterclockwise direction.

When the rotor 4a is driven in a clockwise direction (arrow 4b in FIG. 2), the sections 11 abut against the trailing stops (i.e., the uppermost section 11 abuts against the stop 9 and the section 11a abuts against the stop 8a). Each composite disk 1 then forms with one of the disks 2 a pair of frictionally engaging elements whose frictionally engaging surfaces are illustrated for the sake of clarity as having an effective area of contact which is circular and having a diameter 14. The effective frictional area has, with respect to the clutch axis 13, an "effective friction diameter 12." However, if for some reason (e.g., due to vibration) the rotor 4a begins to rotate in a counterclockwise direction or the rotational speed of the rotor decreases or increases in response to fluctuations in driving torque, the sections 11 begin to rotate about the respective pivots 7 and the magnitude of frictional forces also changes because the effective friction diameter 12 changes as a result of such rotation.

If the rotor 4a continues to rotate in a counterclockwise direction, each section 11 reaches the stop at the other side thereof (i.e., the uppermost section 11 of FIG. 2 moves into abutment with the stop 8a) and the magnitude of frictional forces increases to its maximum value (diameter 12).

The diameter of and the distance between the stops 8, 9 may be selected by full consideration of maximum vibrations of the rotor 4a so that the clutch damps such vibrations and that the vibrations are not transmitted to the clutch shaft 3.

Referring to FIG. 3, there is shown a slightly different multiple-disk clutch wherein the connection between the driven disks 2' and the clutch shaft 18 comprises an elastic coupling. Each disk 2' is provided with inwardly extending teeth which engage the splines of an outer annulus 15, this annulus constituting the outer component of the elastic coupling and being bonded to the peripheral surface of a ring 20 consisting of rubber or the like. The internal surface of the ring 20 is bonded to the periphery of an inner annulus 17 which is provided with inwardly extending teeth to mesh with the splines on the clutch shaft 18. This shaft carries a pinion 19 which may drive a transmission or the like, not shown.

The disks 2' cooperate with outer disks 1' each of which comprises a plurality of sections or segments 11' mounted on pivots 7' and rotatable between stops 8, 9 (only one stop 8 is shown) in the same way as described in connection with FIGS. 1 and 2. The housing or rotor 4a' is bolted to a flywheel 4' (shown in phantom lines) which is rotated by the output shaft of a diesel engine or the like.

The means for biasing the disks 1', 2' into frictional engagement with each other comprises a pressure plate 5' and a series of clutch springs 6'. The manner in which the elastic ring 20 is vulcanized or otherwise bonded to the annuli 15, 17 of the elastic coupling forms no part of our invention. The outer annulus 15 rotates in bearing sleeves 16 which are provided in the rotor 4a' so that the coupling is held against axial movements but that the disks 2' are free to move in the axial direction of the annulus 15.

An important advantages of the elastic coupling is that its ring 20 takes up and absorbs any vibrations which might have been transmitted to the driven disks 2' when the flywheel 4' rotates. Thus, the clutch of FIG. 3 will prevent the transmission of any smaller and/or larger vibrations to the gear 19 and to the parts which are driven by this gear. This clutch is especially suited for use in connection with diesel engines because it prevents transmission of vibrations which develop in response to so-called swelling torque of the driving member. The elastic coupling takes up all such vibrations which are too small to be taken up by the sections 11'.

FIG. 4 illustrates a portion of a third clutch which is assumed to be a so-called single-plate clutch having a single driven disk 2' and a single driving disk 1' consisting of several sections or segments 11'. The disk 2' is provided with radially inwardly extending teeth 2a' which engage the splines on the outer annulus (not shown) of an elastic coupling in the same way as described in connection with FIG. 3.

According to an important feature of the clutch which is shown in FIG. 4, each pivot and/or each stop consists at least in part of resiliently yieldable material such as rubber or synthetic plastic. Each stop comprises a rigid outer tube or shell 21, a rigid cylindrical core member or stud 22 which is fixed to the rotor 4a', and an annular filler 23 of rubber or the like which fills the shell 21 and may but need not be bonded to the core member 22.

Each pivot comprises a rigid core member or bolt 7a', a rigid outer tube or shell 24, and an annular filler 24a of rubber or the like.

FIG. 5 illustrates a clutch wherein the outer disks 1' (consisting of sections 11') and the inner disks 2' are arranged and mounted in the same way as in FIG. 3. However, the rigid cylindrical stops 8, 9 are replaced by resiliently yieldable stops each of which extends radially inwardly from the outer wall or mantle 4c' of the rotor 4a' and each of which assumes the form of a composite body including a rigid outer element 25a which is secured to the mantle 4c' by one or more screws 25b, an elastic central element or cushion 25 which is bonded to the outer element 25a, and a rigid channel shaped inner element 26 which may come into actual face-to-face abutment with each of the two adjacent sections 11'. The central element 25 is subjected to bending stresses whenever the element 26 comes into actual abutment with a section 11'. Such bending is of considerable advantage and is often preferred to the compression of an elastic stop. Thus, the main difference between the stops of FIGS. 4 and 5 is that the element 25 is subjected to bending stresses whereas the filler 23 undergoes compression whenever the shell 21 is engaged by a section 11'.

FIGS. 6 and 7 illustrate a multiple-disk clutch wherein the yieldable stops of FIGS. 4 and 5 are replaced by weights 28 which tend to maintain the sections 11" of driving disks 1" in requisite position under the action of centrifugal force. Each section 11" is formed with an aperture 27 and the apertures 27 in each row of overlapping radially aligned sections 11" are in registry with each other to accommodate a common weight 28. These weights are mechanically connected to each other with some play by means of arcuate links 29 preferably in such a way that the links 29 are alternatively disposed at the one and at the other side of the package consisting of disks 1". In order to insure that each section 11" may rotate through a desired angle about the axis of the corresponding pivot 7", the links 29 are formed with pairs of elongated slots 30 which receive with some play the pins 28a of the respective weights 28.

Each section 11" is further provided with an opening 31 which is located radially inwardly of the respective aperture 27 and which serves to receive a rotatable friction generating insert in the form of a small disk 32 whose thickness exceeds the thickness of the respective section 11" (see FIG. 6).

The position of the sections 11" is determined by the equilibrium between the frictional force with which the inserts 32 engage the driven disks 2" and the centrifugal force which tends to move the weights 28 radially outwardly. In other words, the centrifugal force tends to maintain the axis of each weight 28 in a radial plane which passes through the axis of the corresponding pivot 7" and through the axis of the clutch shaft 18. The weights 28 and the links 29 are functional equivalents of stops 8–9, 21–23 or 25–26 in that they determine the extent to which the sections 11" may pivot about the axes of their pivots 7". It goes without saying that the links 29 may be dispensed with or that each link may carry a weight 28 between a pair of adjacent disk sections 11" so that the number of weights may be reduced in half. All such modifications are so obvious that an illustration is deemed unnecessary. It suffices to say that the weights 28 and links 29 are full functional equivalents of resiliently yieldable stops since they tend to maintain the sections 11″ in a given position but will yield if the magnitude of centrifugal forces decreases or if the magnitude of frictional forces increases.

The disks 32 may consist of steel or of another friction generating material such as is utilized to form the facing of a clutch disk (e.g., cotton and asbestos fibers woven or molded together and impregnated with rosins or similar binding agents). These disks 32 may be replaced at certain intervals.

When the sections (11 or 11′) are without friction generating inserts, friction develops in response to rotation of the sections 11 or 11′ about the respective pivots and in response to linear movement of the inner portions of sections 11, 11′ with reference to the clutch axis. In the embodiment of FIGS. 6 and 7 wherein the sections 11″ are provided with inserts 32, friction develops solely in response to linear movements of sections 11″ but there is normally no rotation of inserts 32 with respect to the inner disks 2″. This will be readily understood since the inserts 32 may rotate in the openings 31 at the time they engage pairs of adjacent disks 2″.

It will be noted that the disks 1″ alternate with the disks 2″ and that the apertures 28 are provided in such portions of the respective sections 11″ which are located radially outwardly of the pivots 7″. Each opening 31 overlaps two adjacent disks 2″.

A feature common to all embodiments of our invention is that the torque transmitted by the driving disk or disks to the driven disk or disks will drop automatically in response to vibrations or other types of irregularities in the rotational speed of the driving member. This is due to the provision of sections which are rotatable about axes located externally of the outlines of the other set of disks. The mode of operation remains unchanged if each driven disk consists of two or more rotatable sections and/or if each driven disk and each driving disk consists of two or more sections. Despite the fact that the one or the other set of disks consists of several sections, the clutch will transmit full torque in a clockwise or counterclockwise direction as soon as the sections rotate through a given angle determined by the corresponding stops. The friction generated by the sections during rotation about the respective pivots is transformed into heat energy which is dissipated by heat exchange with a coolant or with atmospheric air.

The clutch of our invention may be constructed in such a way that it transmits a given torque in a first direction (e.g., 1.1 times the torque of the engine which rotates the driving member) but that it transmits a much smaller torque (e.g., 0.5 times the engine torque or less) when the rotor turns through a small angle in the opposite direction. In the first instance, the effective friction diameter (12) is the effective diameter of the effective frictionally engaging surface area of the one-piece disk or disks with reference to the clutch axis. In the second instance, the effective friction diameter of the effective friction area represented by the circular area with diameter (14) is the diameter of the sections with reference to the respective pivot axes 7. However, as soon as the sections turn about their pivot through a given angle which is determined by the position of the stops, the clutch will again transmit full torque (friction diameter 12). Thus, any vibrations whose amplitude is less than that necessary to move the uppermost section 11 of FIG. 2 from abutment with the stop 9 and into abutment with the stop 8a or vice versa will not be transmitted to the clutch shaft 3 so that the latter will rotate smoothly and will protect the driven assembly against undesirable shocks. The energy which causes vibration of the driving member is transformed into heat energy and is dissipated. In some instances, the sections will rotate continuously about their respective pivots so that the sections might not abut against their stops for considerable periods of time. Therefore, the sliding moment of the clutch may be very small (e.g., 1.1 times the engine moment) which is of considerable advantage in nearly all types of clutches.

Any fluctuations in driving torque which exceed the sliding moment of the clutch will be damped in a very efficient manner and the formation of positive peaks in driving torque is prevented. Negative peaks are fully eliminated and the remaining positive fluctuations in driving torque are very small so that they are only slightly above the selected sliding moment.

While the drawings show a clutch wherein the pressure plate is permanently biased by one or more clutch springs, it will be readily understood that this clutch may be provided with suitable release yokes or with other means for moving the pressure plate against the bias of the clutch springs so that the clutch may be used in an automotive vehicle or in any other machine wherein a driven member may but need not always rotate at the speed of the driving member and wherein the magnitude of torque transmitted to the driven member may be selected at the will of the operator. The clutch which is actually shown in the drawings may serve as a safety clutch because it transmits a predetermined maximum torque such as is determined by the bias of the clutch springs and by certain other factors.

In FIG. 8, the driven disk 102 comprises several sections 112 (only one shown) which are rotatable about pivots 107 mounted on an annular carrier 112a, and this carrier is movable axially of but cannot rotate with respect to the driven member 103. The sections 112 are rotatable to the extent permitted by stops 108, 109 which are secured to the carrier 112a. The driving disk 101 is a one-piece structure which is movable axially of but cannot rotate with reference to the rotor 104a. As explained hereinabove, the disk or disks 101 may be replaced by the disk or disks 1 of FIG. 1 so that each driven disk and each driving disk comprises two or more rotatable sections.

It will be noted that the pivot 107 is arranged in radially spaced relation with reference to the outer disk 101, i.e., that the inner end face of the disk 101 is located radially outwardly of the pivot.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptions should and are intended to be comprehended within the meaning and range of equivalence of the following claims.

What is claimed as new and desired to be secured by Letters Patent is:

1. A friction clutch comprising a driving disk; a rotary driving member coaxial with and arranged to rotate said driving disk; a rotary driven member coaxial with said driving member; and a driven disk concentric with said driving disk and arranged to rotate said driven member in response to frictional engagement with said driving disk, at least one of said disks comprising a plurality of independent sections and a pivot for each of said sections, said pivots being secured to the respective member and being arranged to permit rotation of said sections about axes which are parallel with the common axis of said members so that said sections may rotate about the axes of their pivots in response to fluctuations in driving torque transmitted by said driving member, each of said sections having a portion in constant frictional engagement with the other of said disks and said portion moving toward and away from said common axis of the members in response to rotation of the respective section about its corresponding pivot axis.

2. A friction clutch comprising a driving disk; a rotary driving member coaxial with and arranged to rotate said driving disk; a rotary driven member coaxial with said driving member; and a driven disk concentric with said driving disk and arranged to rotate said driven member in response to frictional engagement with said driving disk, at least one of said disks comprising a plurality of independent sections and a pivot for each of said sections, said pivots being secured to the respective member in radially spaced relation with reference to the other disk and being arranged to permit rotation of said sections about axes which are parallel with the common axis of said members so that said sections may rotate about the axes of their pivots in response to fluctuations in driving torque transmitted by said driving member, each of said sections having a portion in constant frictional engagement with the other of said disks and said portion moving toward and away from said common axis of the members in response to rotation of the respective section about its corresponding pivot axis.

3. A friction clutch comprising a driving disk; a rotary driving member coaxial with and arranged to rotate said driving disk; a rotary driven member coaxial with said driving member; a driven disk concentric with said driving disk and arranged to rotate said driven member in response to frictional engagement with said driving disk, at least one of said disks comprising a plurality of independent sections and a pivot for each of said sections, said pivots being secured to the respective member in radially spaced relation with reference to the other disk and being arranged to permit rotation of said sections about axes which are parallel with the common axis of said members so that said sections may rotate about the axes of their pivots in response to fluctuations in driving torque transmitted by said driving member; and stop means supported by that member which cooperates with said one disk to limit rotation of said sections about the respective pivots.

4. A friction clutch comprising a driving disk; a rotary driving member coaxial with and arranged to rotate said driving disk; a rotary driven member coaxial with said driving member; a driven disk concentric with said driving disk and arranged to rotate said driven member in response to frictional engagement with said driving disk, at least one of said disks comprising a plurality of independent sections and a pivot for each of said sections, said pivots being secured to the respective member in radially spaced relation with reference to the other disk and being arranged to permit rotation of said sections about axes which are parallel with the common axis of said members so that said sections may rotate about the axes of their pivots in response to fluctuations in driving torque transmitted by said driving member; and resiliently yieldable stop means supported by that member which cooperates with said one disk to limit rotation of said sections about their respective pivots.

5. A friction clutch comprising a driving disk; a rotary driving member coaxial with and arranged to rotate said driving disk; a rotary driven member coaxial with said driving member; a driven disk concentric with said driving disk and arranged to rotate said driven member in response to frictional engagement with said driving disk, at least one of said disks comprising a plurality of independent sections and a pivot for each of said sections, said pivots being secured to the respective member in radially spaced relation with reference to the other disk and being arranged to permit rotation of said sections about axes which are parallel with the common axis of said members so that said sections may rotate about the axes of their pivots in response to fluctuations in driving torque transmitted by said driving member, at least a portion of each pivot consisting of resiliently yieldable material; and stop means supported by that member which cooperates with said one disk to limit rotation of said sections about the respective pivots.

6. A friction clutch comprising a driving disk; a rotary driving member coaxial with and arranged to rotate said driving disk; a rotary driven member coaxial with said driving member; a driven disk concentric with said driving disk and arranged to rotate said driven member in response to frictional engagement with said driving disk, at least one of said disks comprising a plurality of independent sections and a pivot for each of said sections, said pivots being secured to the respective member in radially spaced relation with reference to the other disk and being arranged to permit rotation of said sections about axes which are parallel with the common axis of said members so that said sections may rotate about the axes of their pivots in response to fluctuations in driving torque transmitted by said driving member; and a plurality of stop means supported by that member which cooperates with said one disk to limit rotation of said sections about the respective pivots, each of said stop means comprising an elastic element which is subjected to bending stresses when the respective stop means is engaged by one of said sections.

7. A friction disk as set forth in claim 6, wherein each of said stop means further comprises a rigid second element secured to the respective elastic element and having a portion which may come into face-to-face abutment with at least one section.

8. A friction clutch comprising a driving disk; a rotary driving member coaxial with and arranged to rotate said driving disk; a rotary driven member coaxial with said driving member; a driven disk concentric with said driving disk and arranged to rotate said driven member in response to frictional engagement with said driving disk; at least one of said disks comprising a plurality of independent sections and a pivot for each of said sections, said pivots being secured to the respective member in radially spaced relation with reference to the other disk and being arranged to permit rotation of said sections about axes which are parallel with the common axis of said members so that said sections may rotate about the axes of their pivots in response to fluctuations in torque transmitted by said driving member; stop means supported by that member which cooperates with said one disk and arranged to limit rotation of said sections about their respective pivots; and an elastic coupling disposed between one of said members and the respective disk to transmit torque therebetween.

9. A friction clutch comprising a driving disk; a rotary driving member coaxial with and arranged to rotate said driving disk; a rotary driven member coaxial with said driving member; a driven disk concentric with said driving disk and arranged to rotate said driven member in response to frictional engagement with said driving disk, at least one of said disks comprising a plurality of independent sections and a pivot for each of said sections, said pivots being secured to the respective member in radially spaced relation with reference to the other disk and being arranged to permit rotation of said sections about axes which are parallel with the common axis of said members so that said sections may rotate about the axes of their pivots in response to fluctuations in torque transmitted by said driving member; stop means supported by that member which cooperates with said one disk and arranged to limit rotation of said sections about their respective pivots; and an elastic coupling disposed between said other disk and the respective member to transmit torque therebetween.

10. A friction clutch comprising a driving disk; a rotary driving member coaxial with and arranged to transmit driving torque to said driving disk; a rotary driven member coaxial with said driving member; a driven disk concentric with said driving disk and arranged to transmit torque to said driven member in response to frictional engagement with said driving disk, at least one of said disks comprising a plurality of independent adjacent sections and a pivot for each section, said pivots being secured to that member which cooperates with said one disk and being arranged to permit rotation of said sections about axes which are parallel with the common axis of said members so that said sections may rotate about the axes of the respective pivots in response to fluctuations in torque transmitted by said driving member, each of said sections having a portion in constant frictional engagement with the other of said disks and said portion moving toward and away from said common axis of the members in response to rotation of the respective section about its corresponding pivot axis, and a weight secured to each of said sections so as to normally fix the angular positions of said sections with reference to the respective pivots in response to centrifugal force when said disks rotate.

11. A friction clutch as set forth in claim 10, further comprising mechanical connecting means for the weights of adjacent sections, said connecting means permitting at least some rotation of the sections about the respective pivots.

12. A friction clutch as set forth in claim 11, wherein said mechanical connecting means comprises a plurality of links which are alternatively disposed at the opposite sides of said one disk.

13. A friction clutch comprising a package of concentric driving disks; a rotary driving member coaxial with and arranged to transmit driving torque to said package of driving disks, said driving member comprising means permitting axial movements of said disks; a rotary driven member coaxial with said driving member; a package of driven disks alternating with and concentric to said driving disks, said driven disks being movable in the axial direction of and being arranged to transmit driving torque to said driven member in response to frictional engagement with said driving disks, each disk in at least one of said packages comprising a plurality of independent apertured sections and each section of one multi-section disk being in radial alignment and forming a row of sections with one section of each other multi-section disk; a pivot for each row of sections, said pivots being secured to that member which cooperates with said one package of disks and being arranged to permit rotation of said sections about axes which are parallel with the common axis of said members and each pivot being radially spaced with reference to the disks of the other package; and a weight provided in the apertures of each row of sections so as to normally fix the angular positions of the respective rows with reference to their pivots in response to centrifugal force when said packages of disks rotate.

14. A friction clutch as set forth in claim 13, wherein each of said sections comprises an outer portion located radially outwardly of the respective pivot and wherein said weights are received in said outer portions.

15. A friction clutch comprising a package of concentric driving disks; a rotary driving member coaxial with and arranged to transmit torque to said package of driving disks, said driving member comprising means permitting axial movements of said disks; a rotary driven member coaxial with said driving member; a package of driven disks alternating with and concentric to said driving disks, said driven disks being movable in the axial direction of and being arranged to transmit torque to said driven member in response to frictional engagement with said driving disks, each disk of at least one of said packages comprising a plurality of independent sections each having an opening overlapping the adjacent disks of the other package and each section of one multi-section disk being in radial alignment with one section of each other multi-section disk so that such sections form rows of radially aligned sections, a pivot for each row of sections, said pivots being secured to that member which cooperates with said one package of disks and permitting the respective sections to rotate about axes which are parallel with the common axis of said members; and a friction generating insert rotatably received in the opening of each section and having a thickness exceeding the thickness of the respective section so as to engage the adjacent disks of the other package in response to axial compression of said packages.

16. A friction clutch comprising a driving member and a driven member; a clutch disk carried by and arranged to rotate with each of said members; at least one of said disks being movable axially of the respective member into frictional engagement with the other disk and at least one of said disks being a multi-section disk having a plurality of sections arranged to rotate about pivot axes which are parallel with the clutch axis; and a plurality of stop means for limiting the rotation of said sections.

17. A friction disk as set forth in claim 16, wherein said pivot axes are located on the periphery of a circle which is radically spaced from the other disk.

18. A friction disk as set forth in claim 16, wherein said sections are equidistant from each other and wherein each thereof is rotatable between two end positions in each of which it engages a different stop.

19. A friction clutch comprising a driving member and a driven member; a clutch disk carried by and arranged to rotate with each of said members, at least one of said disks being movable axially of the respective member into frictional engagement with the other disk and that disk which is carried by said driving member being a multi-section disk having a plurality of sections arranged to rotate about pivot axes which are parallel with the clutch axis; and a plurality of stop means for limiting the rotation of said sections.

20. A friction clutch comprising a driving member and a driven member; a clutch disk carried by and arranged to rotate with each of said members, at least one of said disks being movable axially of the respective member into frictional engagement with the other disk and that disk which is carried by said driven member being a multi-section disk having a plurality of sections arranged to rotate about pivot axes which are parallel with the clutch axis; and a plurality of stop means for limiting the rotation of said sections.

References Cited by the Examiner

UNITED STATES PATENTS

| | | | |
|---|---|---|---|
| 2,039,590 | 5/1936 | Freeborn | 192—69 |
| 2,419,890 | 4/1947 | Freeborn | 192—105 |

DAVID J. WILLIAMOWSKY, *Primary Examiner.*

A. T. McKEON, *Assistant Examiner.*